United States Patent
Chang et al.

(10) Patent No.: US 7,389,526 B1
(45) Date of Patent: Jun. 17, 2008

(54) SYSTEM AND METHOD FOR RECORDING A DIGITAL VIDEO IMAGE

(75) Inventors: E-Lee Chang, Mableton, GA (US); Edward Michael Silver, Atlanta, GA (US); William J. Gaylord, Stone Mountain, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 942 days.

(21) Appl. No.: 10/003,557

(22) Filed: Nov. 2, 2001

(51) Int. Cl.
*H04N 7/173* (2006.01)

(52) U.S. Cl. .................................................. 725/105

(58) Field of Classification Search ..................... None
See application file for complete search history.

(56) References Cited

U.S. PATENT DOCUMENTS

| | | | |
|---|---|---|---|
| 4,884,132 A | 11/1989 | Morris et al. | |
| 5,793,419 A | 8/1998 | Fraley | |
| 5,799,082 A * | 8/1998 | Murphy et al. | 713/179 |
| 5,917,542 A | 6/1999 | Moghadam et al. | |
| 5,983,073 A | 11/1999 | Ditzik | |
| 6,037,977 A * | 3/2000 | Peterson | 348/148 |
| 6,202,060 B1 * | 3/2001 | Tran | 707/3 |
| 6,259,405 B1 * | 7/2001 | Stewart et al. | 342/457 |
| 6,262,764 B1 | 7/2001 | Perterson | |
| 6,323,897 B1 | 11/2001 | Kogane et al. | |
| 6,513,119 B1 * | 1/2003 | Wenzel | 726/2 |
| 6,675,006 B1 * | 1/2004 | Diaz et al. | 455/404.1 |
| 6,791,472 B1 * | 9/2004 | Hoffberg | 340/905 |
| 6,868,074 B1 * | 3/2005 | Hanson | 370/328 |
| 7,023,913 B1 * | 4/2006 | Monroe | 375/240.01 |
| 2004/0045030 A1 * | 3/2004 | Reynolds et al. | 725/110 |

OTHER PUBLICATIONS

U.S. Appl. No. 09/953,997, filed Sep. 17, 2001, Chang, E-Lee et al.
Mobile camera CommuniCam™ MCA-10, Specifications, pp. 1-2.
"Springboard Modules," Handspring, (Aug. 29, 2001) pp. 1-2.
"X-Cam2 Tiny Wireless Video Camera Special Offer," Home Solutions, www.x10.com. (Sep. 12, 2001) pp. 1-4.
"Web Cameras That Offer More," PCWORLD.COM, (Sep. 12, 2001) pp. 1-2.
"The TruePosition® Wireless Location System," www.trueposition.com/sol_arch.html, (Sep. 27, 2001) pp. 1-2.
"The TruePosition® Wireless Location System," www.trueposition.com/tpdiagram.html, (Sep. 27, 2001) p. 1.
"Saving Lives Through Faster Response," TruePosition®—E-911, www.trueposition.com/e911.html, pp. 1-2.

* cited by examiner

*Primary Examiner*—Nhon T Diep
(74) *Attorney, Agent, or Firm*—Merchant & Gould

(57) ABSTRACT

A method and system for recording a digital video image is described. An embodiment of the present invention includes a video-capture device, connected to a wireless-communication device. The wireless-communication device transmits images captured by the real-time video-capture device to a receiving facility via a communications network. The receiving facility may comprise, for example, a security office. The receiving facility processes the images, monitoring, storing, forwarding and deleting the images as necessary.

22 Claims, 5 Drawing Sheets

SYSTEM AND METHOD FOR RECORDING A DIGITAL VIDEO IMAGE

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention generally relates to the recording of digital video images. The present invention more particularly relates to the recording of digital video images that have been captured remotely.

BACKGROUND

Individuals are often confronted by situations that are ambiguous in terms of security. For example, a routine traffic stop may become dangerous for the stopped driver if the police officer turns out to be an impersonator. In some instances, the driver has some indication that a situation may become dangerous, but the indication may be indefinite.

In a situation such as the traffic stop, the driver may desire a witness in case the situation does become dangerous. One alternative is for the driver to use a cellphone to dial 911. However, since the situation may actually be safe, the driver may not wish to dial 911 until she is sure that the situation is dangerous. Also, a 911 operator will not be able to see the situation the driver is confronting.

To provide a visual record of the situation, the driver can use a video recorder to record the event. Unfortunately, it may be unlikely that the driver has a video recorder in the call. Also, if the police officer is indeed an impersonator, it is likely that the impersonator will take and/or destroy the videotape, and the driver is no better off than without the recorder. A means is desired to record the event visually in a manner that cannot be defeated by the impersonator and that provides an option to notify an authority if the situation is in fact dangerous.

Ambiguous security situations occur at home and in the workplace. In response, many individuals purchase security systems. In a home, these systems comprise sensors arranged throughout the home and often include a monitoring service provided by a security company. Organizations often install monitored security systems in the workplace as well. A few of these security systems comprise video cameras. These systems work well for the home and workplace, notifying the security company when a potential problem occurs. Unfortunately, these systems are not mobile. The cameras reside in a fixed position, and their movement is restricted to rotation around a horizontal and/or vertical axis.

In ambiguous situations occurring away from the home and workplace, it would be advantageous to have a system and method for providing mobile video-recording that transmits video images to a remote facility, such as a security office. It would also be advantageous if the receiving facility monitored the video images and notified authorities as necessary. It would be particularly advantageous if the system and method allowed the user to direct the receiving facility to retain or discard the video image based on an action or omission on the part of the user.

SUMMARY

Embodiments of the present invention address these needs by providing systems and methods for recording a digital-video image. An embodiment of the present invention includes a video-capture device connected to a wireless-communication device. The wireless-communication device transmits images captured by the video-capture device to a receiving facility via a communications network, such as a wireless telephone network and/or the Internet.

In an embodiment of the present invention, a video camera and wireless-communication device may comprise a single device or multiple devices. For example, an embodiment of the present invention may comprise a video camera attached to, or integrated with, a cellphone or personal digital assistant (PDA). Another embodiment comprises a video camera connected to a laptop computer. The laptop computer communicates with the communication network via a wireless modem. An embodiment of the present invention advantageously utilizes long-range communication technology to communicate with the communications network.

In an embodiment of the invention as a "Video Witness," the receiving facility comprises a security office. The receiving facility may monitor, store, and/or forward the video images, and may notify a governmental agency, such as the police, if the images received so warrant. In another embodiment of the present invention, the receiving facility comprises a user's home.

It is advantageous in an embodiment of the present invention to identify the user transmitting the video image as well as the location of origin of the video image. Therefore, an embodiment of the present invention comprises a user-identification device and a user-location device. The user-identification device may comprise the wireless-communication device. The user-identification device may also comprise a separate device, such as a smart card. The user-location device may comprise a hand-held global positioning system (GPS) or a GPS receiver integrated into a wireless-communication device. The location device may also comprise an element of a cellular network used to enable emergency 911 (E-911) services.

When a receiving facility receives the images, the receiving facility processes the images. As part of the processing, the receiving facility links the images to the user identified in the transmission. To accomplish linking, the receiving facility may use a user-profile database. In one embodiment of the present invention, the receiving facility combines information from the user-profile database with information in a telephone-service provider's subscriber database to more fully identify the user. For example, a subscriber database may contain information not available in a user-profile database, such as a user's full address.

To support provision of the service financially, an embodiment of the present invention includes a billing calculation device. The billing calculation device may facilitate charging a user based on a flat rate, per use, or use some other method of billing that is appropriate for a telecommunications service.

An embodiment of the present invention provides numerous benefits over conventional video-recording solutions. An embodiment of the present invention provides a mobile security system, which is both affordable and simple to operate.

Further, an embodiment of the present invention provides an economical method of recording images and storing them in a remote facility. The user is not dependent on a local storage media to retain the digital images.

An embodiment of the present invention also provides a receiving facility, which provides additional beneficial services. The receiving facility monitors, stores, and forwards the digital images. If necessary, the receiving facility may also notify a governmental agency, such as the police, when a potentially dangerous situation occurs. Also, the receiving facility ensures that the digital images are properly backed up and/or archived. By performing these routine administrative duties for a user, the receiving facility greatly simplifies the recording process for a user.

Further details and advantages of the present invention are set forth below

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for recording a digital image. An embodiment of the present invention comprises a video-capture device, a wireless-communication device, a communications network and a receiving facility. The video-capture device records images and transmits the images to a receiving facility, using the wireless-communication device. The receiving facility processes the images, performing monitoring, recording, forwarding and deleting of the images.

Figure 1:
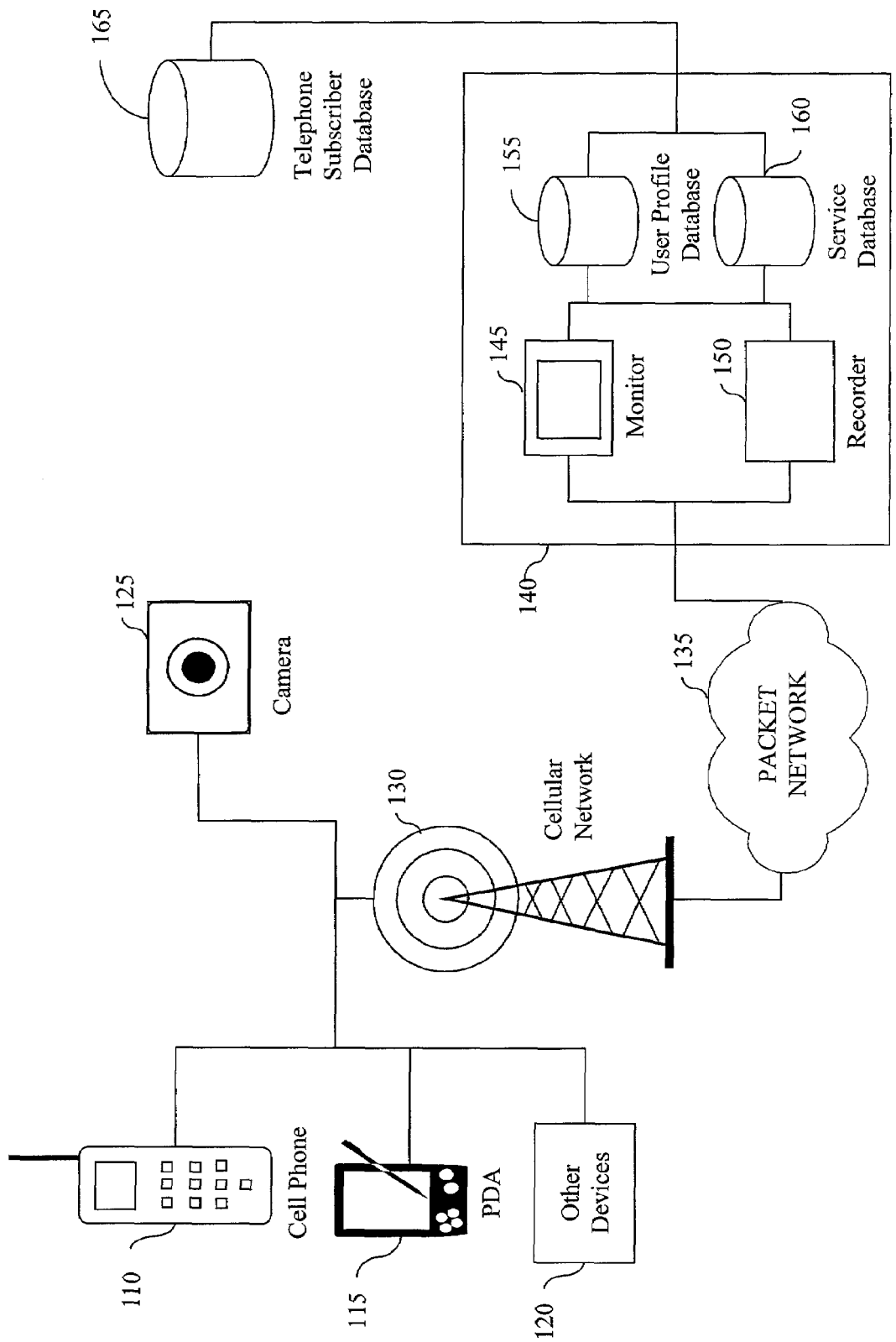
FIG. 1 is a diagram of an exemplary environment for operation of an embodiment of the present invention.

FIG. 1 illustrates an exemplary embodiment of the present invention. Although specific examples of digital media and transport technologies are described herein, various technologies may be employed, so long as they provide acceptable performance.

As shown in FIG. 1, an embodiment of the present invention comprises a video-capture device. The video-capture device may comprise a camera attached to or integrated into a cellphone 110 or personal digital assistant (PDA) 115. The video-capture device may also comprise a stand-alone camera 125, such as a mini wide-angled-video camera. The video-capture device may additionally capture audio and data and integrate the additional material with the video recording.

Various conventional cameras are designed to attach to a cellphone 110 or a PDA 115. For example, the Ericsson CommuniCam™ MCA-10 provides the users of an Ericsson cellphone with the capability to transmit video directly over a cellphone. The CommuniCam™ attaches to a port on the cellphone and utilizes the cellphone to transmit the images. Also, the user of a Handspring™ PDA can connect a digital camera, such as an eyemodule2™, to the PDA to capture images (CommuniCam™ is a trademark of Telefonaktiebolaget LM Ericsson of Stockholm, Sweden; Handspring™ and eyemodule2™ are trademarks of Handspring, Inc. of Mountain View, Calif.).

The video-capture device communicates with the wireless-communication device using various means. Attached or integrated cameras communicate directly with the wireless-communication device. Other cameras may use various wireless technologies to communicate with a wireless-communication device.

Relatively good-quality miniature digital cameras about the size of a dime and miniature microphones are readily available. Such a digital camera may utilize a USB connection to communicate with a laptop, which utilizes a wireless modem, such as a cellular modem, to complete wireless communications. A digital camera may utilize other methods to communicate with a laptop, including, for example, Bluetooth or 802.11a/b wireless networking (Bluetooth™ is a trademark of Telefonaktiebolaget LM Ericsson of Stockholm, Sweden).

Referring again to FIG. 1, the wireless-communication device 110, 115, 120 transmits the video images to a wireless network, such as cellular network 130. Other networks may be utilized as well. For example, not all PDA's use a standard cellular network; Palm PDA's use proprietary networks in some cities to receive and transmit data.

The cellular network 130 is in communication with a packet network 135. The packet network 135 may comprise a private network, such as an intranet, extranet or virtual private network, or may comprise a public network, such as the Internet. The packet network 135 supports a conventional communication protocol such as Internet protocol (IP).

Transmission of the video images continues through the packet network 135 to a receiving facility 140. Although communication between the video-capture device 125 and communicating device 120 may occur via Bluetooth or other short-range technology, an embodiment of the current invention most advantageously utilizes longer-range communication technology to communicate with the wireless network 130.

A receiving facility 140 may comprise any of a number of different types of facilities. For example, an embodiment of the present invention may be used to record potentially dangerous events, acting as a "Video Witness." A Video Witness provides a user in a potentially dangerous situation with the ability to record the video images of the potential perpetrators and the event using a video-capture device 110, 115, 120.

In such an embodiment, the receiving facility 140 comprises a secure remote location, such as a security office, analogous to a facility that monitors a home security system. In another embodiment, the receiving facility 140 comprises a user's home.

The receiving facility 140 processes the images. Processing of the images may comprise monitoring the images on a monitor 145 or recording the images on a recorder 150. Processing may also comprise forwarding the image to a governmental agency, such as the police, backing up the data to reduce the potential for data loss, periodically archiving the data, and other functionality necessary to support the needs of the users and administrators of the system.

In order to perform this additional functionality, a receiving facility 140 in an embodiment of the present invention may comprise additional devices. For example, forwarding the video image received from a user requires a transmitting device. Also, sending notification to a government agency may require the use of a specialized transmitting device. For example, for security and reliability reasons, a police department may communicate on a radio frequency not commonly available to external organizations.

Also, in the embodiment shown in FIG. 1, the receiving facility 140 associates the images with user profile information stored in a user-profile database 155 through the use of identifying information contained in the video image transmission. The user-profile data may be augmented using data in an external database, such as a telephone service provider's subscriber database 165.

In an embodiment of the present invention, the user-profile database 155 comprises a table of all subscribers to the service. Each record in the table corresponds to a subscriber. Each user-profile record comprises fields, including, for example, the user's first and last name and the user's passcode. The telephone subscriber database 165 also comprises a table. Each subscriber record in the table corresponds to a telephone service subscriber. Each record comprises fields, including the telephone subscriber's address, data that may not be available in the user-profile database 155.

Both the user-profile database 155 and the telephone subscriber database 165 store a key piece of information in order to link the data contained in the two databases. In an embodiment of the present invention, both of these databases include a user identification number, such as the user's telephone number, to identify the user. In the embodiment shown in FIG. 1 the video, GPS information, user identification, and other data are stored in another database, for example, a service database 160.

Various embodiments of the present invention may include additional elements as well (not shown in FIG. 1). For example, in order to fund the provision of the recording of video, an embodiment of the present invention may include a billing device. The billing device calculates a bill based on various factors, including, for example, the number of times the service is used by a subscriber during a billing period, the volume of data the subscriber wishes to record and store, or other relevant measure.

Figure 2:
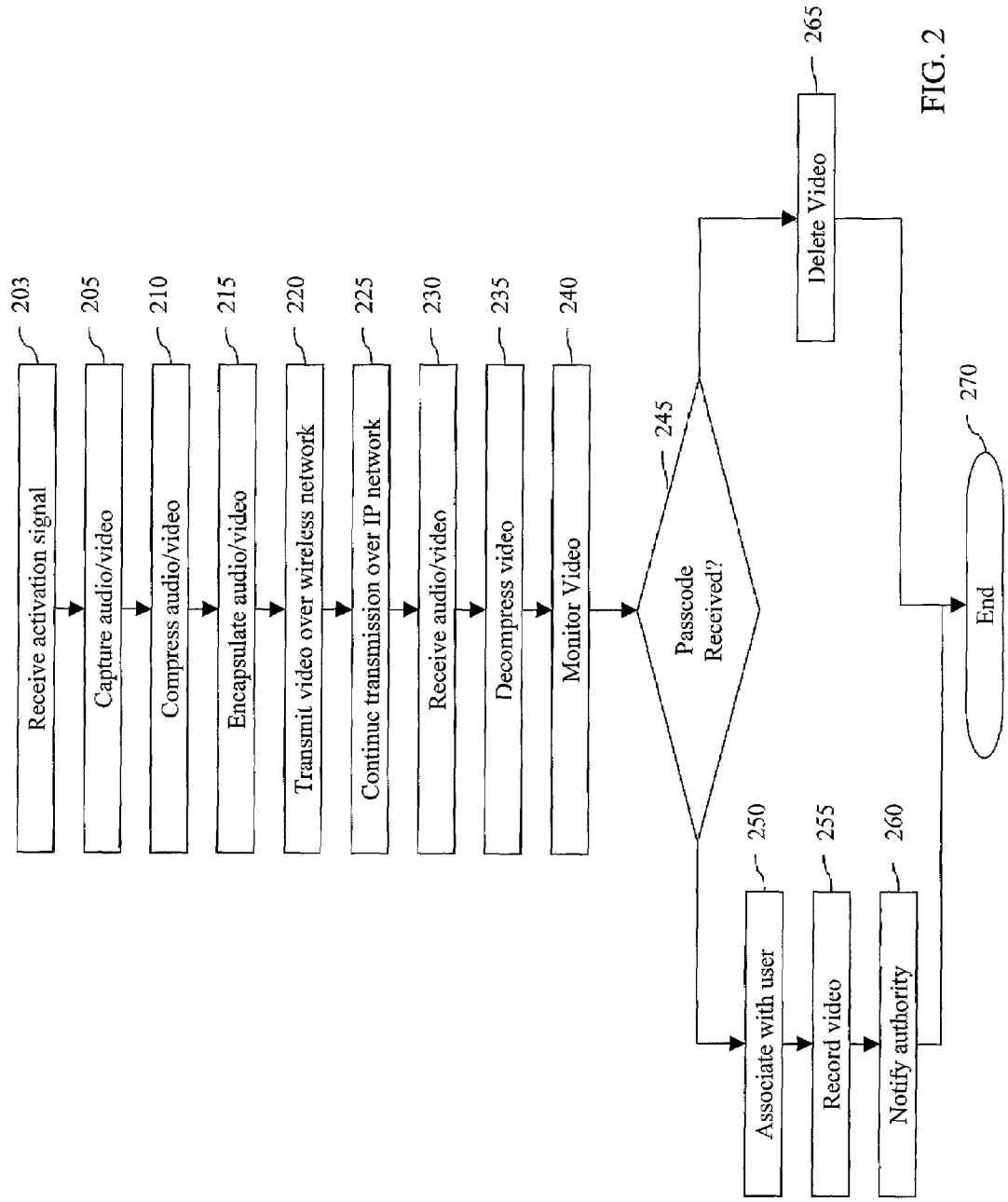
FIG. 2 is a flowchart illustrating the process of capturing, transmitting and processing a video image in an embodiment of the present invention.

An embodiment of the present invention provides the user with the capability of recording video images in a variety of situations. FIG. 2 illustrates a basic process of capturing, transmitting and processing video in an embodiment of the present invention.

When the user encounters a situation that the user wishes to record, the user activates the video-capture device 203, for example a cellphone 110 with attached or integrated camera. Once activated, the cellphone 110 captures the video images 205. The device next compresses the video for transmission so that the transmission consumes minimal communication resources and elapsed transmission time 210.

In an embodiment of the present invention, when recording begins, compressed video images are transmitted continuously to the receiving facility 140 while the recording is in progress. Therefore, data bandwidth (data channel throughput or transmission speed) is a critical issue. Wireless data channel capacity is at a premium, and therefore, compression or reduction of the video data rates is preferred for wireless data communication. The advent of single chip coder-decoders (CODEC's) have made sophisticated compression of the video data rates practical for the small devices in an embodiment of the present invention.

Once the video has been compressed, the wireless-communication device encapsulates the video data for transmission over the wireless network 215. The communication device then transmits the compressed file over a wireless network 220, such as cellular network 130.

An embodiment of the present invention continues the transmission of the file over a packet network 225 to the receiving facility 140 of FIG. 1. At the receiving facility, the compressed and encapsulated video file is received 230 and decompressed 235.

The receiving facility 140 then processes the video. Processing the video may comprise monitoring the images 240. Also, if the receiving facility 140 receives a valid passcode, the receiving facility 140 deletes the video. In contrast, if the receiving facility does not receive a valid passcode, the receiving facility may associate the video images with a user in the user-profile 155 and telephone subscriber 160 databases 250. The receiving facility 140 may further record the video 255. And if the situation warrants, the receiving facility 140 may notify authorities that a potentially dangerous situation is occurring 260. Once the receiving facility had either deleted the video or notified authorities, the process ends 270.

Figure 3A:
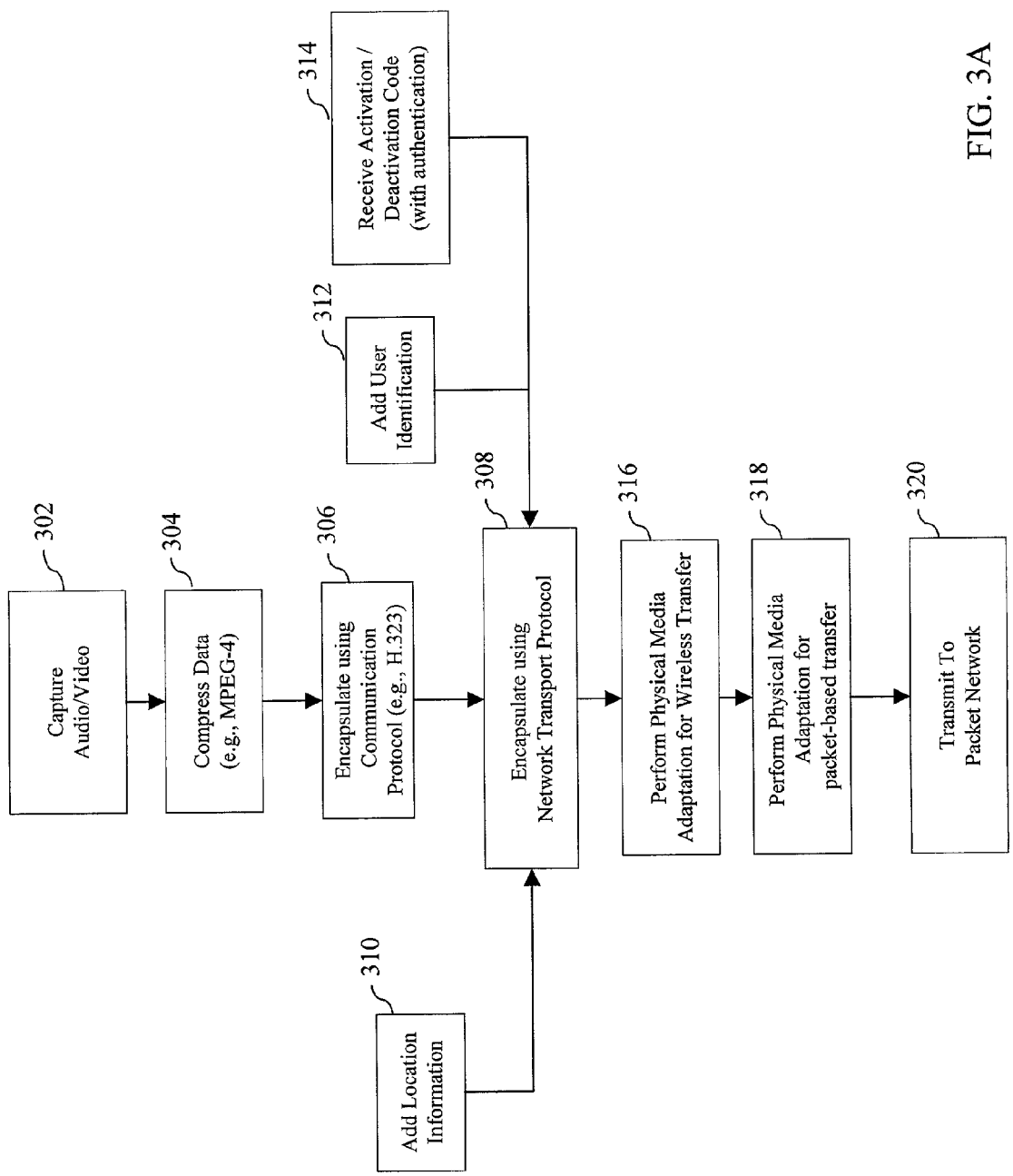
FIGS. 3A and 3B are flowcharts further detailing the process of capturing, transmitting and processing a video image in an embodiment of the present invention.
Figure 3B:
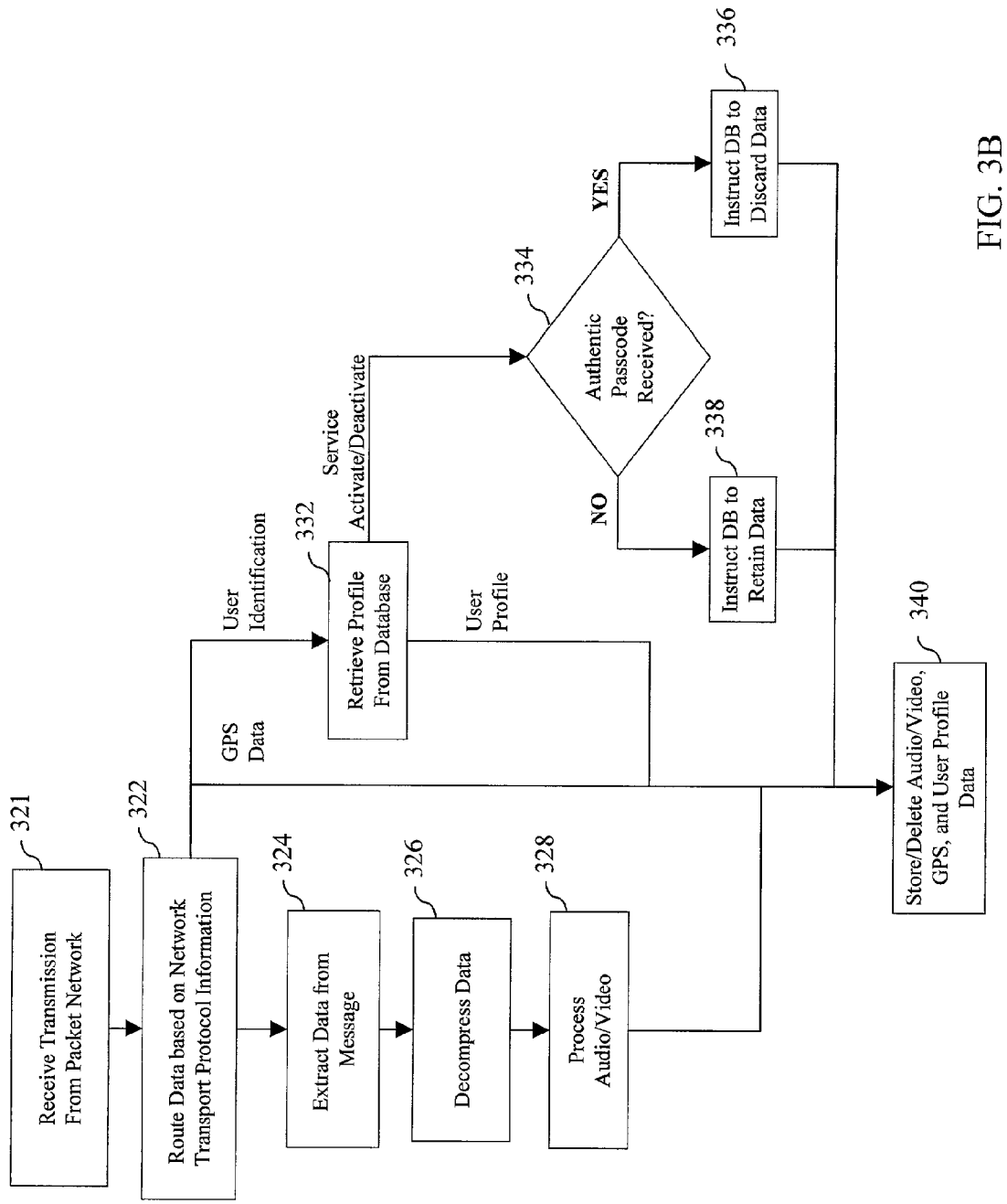

FIGS. 3A and 3B detail the method an embodiment of the present invention performs in further detail. FIG. 3A includes the steps necessary to transmit the video to a packet network 135. As shown in FIG. 3A, the method begins when a video-capture device, such as cellphone 110, begins capturing video images 302. The video-capture device stores the video on a non-volatile medium, such as a magnetic disk, memory stick, or electrically erasable and programmable read-only memory chip (EEPROM).

In order to efficiently transmit the video, the data is preferably compressed. The video-capture or wireless-communication device compresses the data using a standard video compression format, such as MPEG-4 compression, resulting in a compressed data file 304.

Once the video is compressed, the video-capture or wireless-communication device encapsulates the compressed data file with communication protocol information 306. Packet-based audiovisual communications protocols, such as the International Telecommunications Union (ITU-T) H.323 standard, adapt the "raw" video and audio data streams for packet network transport and manage the establishment of private communications channels to the receiving facility 140. H.323 is a standard for real-time videoconferencing over networks, including the Internet, and specifies elements, such as CODEC's, for the transportation of any combination of voice, video and data. Other standard protocols may be used to compress the data as well.

The wireless-communication device next prepares the video for transmission over the wireless 130 and packet networks 135, encapsulating the file using a network transport protocol 308. Internet Protocol (IP) based packet network transport is the most ubiquitous means of worldwide data transport and an advantageous option for an embodiment of the present invention.

One embodiment of the present invention utilizes real-time transport protocol (RTP), an Internet protocol (IP) that supports real-time transmission of video. RTP includes time-stamping and synchronization information in the header of a transmission. RTP may utilize user datagram protocol (UDP) for transmission. UDP ignores lost data packets, and is therefore ideal for transmitting real-time video in a medium in which minimal time is available to retransmit data packets. To ensure quality of service, an embodiment of the present invention may also utilize real-time control protocol (RTCP), which reports network congestion states to devices participating in a communication.

Other conventional protocols may also be utilized. For example, an embodiment of the present invention may use transmission control protocol (TCP) to transmit the video file. TCP, unlike UDP, ensures that an embodiment of the present invention sends the file accurately and completely by retransmitting lost data packets.

Also, to further prepare the file for network transport 308, the wireless-communication device in an embodiment of the present invention may append additional information to the file that allows proper routing of the data over a network. For example, if the data packets travel within an Ethernet network, Ethernet headers and trailers will be placed at the beginning and end of the file.

An embodiment of the present invention may append additional information onto the video information as well. For example, it may be advantageous to transmit the location of the origin of the video, which should correspond to the location of the user 310. To automatically provide accurate location information, an embodiment of the present invention comprises a Global Positioning System (GPS) processor or emergency-911 (E-911) type of localization technology. The localization technology adds the location information to the video file for transport and may be integrated into the video-capture or wireless-communication device, be attached as an accessory, or implemented through server-based technology within the wireless network.

Technology to add location information is available in conventional wireless-communication devices and networks. In 1996, the Federal Communications Commission (FCC) issued a Report and Order wireless providers to provide the location of wireless handsets. The initial requirements were that the provider have the ability to provide the phone number as well as the position of the cell cite or base station with which the handset is communicating. If no precise means of locating the wireless-communication device exists, the wireless-communication device transmits this basic information to the receiving facility 140.

The FCC order mandates that precise positioning be available by the end of 2002. Precise location may be accomplished through either handset or network-based technology. Several approaches for locating a handset or other mobile device exist. For example, the Handspring™ PDA may be equipped with a phone module. Additionally, Handspring, Inc. offers a Magellan GPS Companion™ with Handspring™ PDA that can locate the PDA device precisely by using global positioning satellites.

Network-based systems may also be utilized in an embodiment of the present invention to provide location information. For example, TruePosition® offers the Wireless Location System™ to wireless-communication providers for providing E-911 service as mandated by the Federal Communications Commission. The Wireless Location System™ comprises various components that allow a provider to locate a cellular phone by using information from nearby mobile base stations. The system computes the position using time difference of arrival (TDOA) and angle of arrival (AOA) algorithms (TruePosition™ and Wireless Location System™ are trademarks of TruePosition, Inc of King of Prussia, Pa.).

The identity of the user may also provide valuable information. Referring again to FIG. 3A, an embodiment of the present invention includes user-identification information with the transmitted video signal 312. An identification device, such as a smart card, may be utilized by an embodiment of the present invention to facilitate identification of the user. For example, Global Systems for Mobile communications (GSM) wireless phones utilize a subscriber identity module to store user-specific information in a GSM-capable wireless device.

The transmission may include activation/deactivation codes as well. Activation/deactivation codes provide instructions to an embodiment of the present invention for maintaining the data and for signaling the receiving facility that an alert to a governmental authority may be necessary 314. To ensure the user's security, an embodiment of the present invention may require authentication information in addition to the activation/deactivation information.

For example, if a user activates video recording but subsequently determines that the situation is not dangerous, the user ends the recording. But if the user simply ends the recording without informing the receiving facility 140 that the situation is safe, the receiving facility 140 may alert authorities. Therefore, when the user ends a recording the user may also include a deactivation code, signaling the receiving facility to end monitoring/recording of the video. To help ensure that the user has not been coerced into sending the deactivation code, the receiving facility 140 may require that the user include authentication information, such as a passcode, with the deactivation code.

Once the wireless-communication device encapsulates the video for network transmission, the video is readied for wireless transfer. The wireless-communication device performs physical media adaptation on the data and information, utilizing the wide-code division multiplex access (W-CDMA) method for transmitting the video 316. W-CDMA provides a fast, efficient method of transporting information over wireless networks, such as cellular network 130.

Data rates of from 64 Kb/s to 384 Kb/s are advantageous for sufficient video quality in an embodiment of the present invention. W-CDMA provides sufficient bandwidth to support 384 Kb/s for mobile communications, and up to 2 Mb/s for fixed wireless communications devices.

The wireless-communication device, such as cellphone 110, transmits the signal to the cellular network 130. The cellular network receives the W-CDMA transmission 318, performs a second adaptation for transmitting data in a packet network, and forwards the data and information to the packet network 135 shown in FIG. 1 320.

FIG. 3B details steps in a method an embodiment of the present invention utilizes once the video has been transmitted to the packet network 135, 320. As shown in FIG. 3B, the receiving facility 140 receives the transmission from the packet network 135, 321. The receiving facility 140 then utilizes the network transport protocol information to route the information within the receiving facility 322, and utilizes the communications protocol information to determine how to decode the transmitted video. The receiving facility 140 decompresses the video, using a CODEC, which is compatible with the CODEC used to compress the video, such as MPEG-4 326.

Also, as shown in FIG. 3B, the transmitted information may include non-compressed, non-encoded user-identification, authentication and GPS data. The user-identification information is used to retrieve user-profile information from the user-profile database 332. For example, the user-identification information may comprise the user's wireless-handset number. This number is used by the receiving facility to query the user-profile database 155 for information related to the user, such as the user's home address.

The receiving facility 140 uses the authentication information in conjunction with the activation and deactivation codes to determine how to process the video. For example, as shown in FIG. 3B, once the receiving facility 140 retrieves the user profile, the receiving facility 140 checks the transmitted message to determine whether the user has included an activation or deactivates code. If the user has sent a deactivation code, the receiving facility 140 must compare the passcode the user transmits with the passcode the receiving facility 140 has retrieved form the user-profile database 334. If the receiving facility 140 determines that the user has deactivated the service using a valid passcode, the receiving facility 140 deletes the video 336. If the user fails to send a passcode or sends an invalid passcode, the receiving facility 140 retains the data and may notify authorities as well.

In the embodiment shown in FIG. 3B, a user of an embodiment of the present invention provides a passcode, which the system authenticates 334. If the receiving facility 140 receives an authentic passcode from the user, the receiving facility 140 records a deletion indicator, instructing the service database 160 to discard the data 336. In contrast, if the user does not provide a passcode or provides an incorrect passcode, the receiving facility 140 records a retention indicator, instructing the service database to retain the video data 338.

The service database 160 stores or deletes data based on the deletion/retention indicators. In addition, the service database may delete any data related to a particular event and any reproductions of the data, such as a backup, after the passage of a period of time. The period of time that passes before the stored video is deleted from permanent storage may be user-specified. Once the period of time has elapsed, a deletion indicator is recorded, instructing the service database 160 to delete the data. Deletion of the data may occur logically or physically. In the case of a logical deletion, a logical deletion data field in a table in the service database 160 identifies data as having been deleted, but the data remains physically in the service database 160. In contrast, physically deleted data is removed from the service database 160.

The receiving facility 140 may perform additional processing in relation to a recording. For example, in an embodiment of the present invention as a Video Witness, when the video recording arrives at the receiving facility, a security company, the images are decompressed automatically for viewing to determine whether the situation being recorded is dangerous. If the user indicates that s/he is in immediate danger of being harmed, a security agent in the receiving facility 140 is alerted and the recorder 150 automatically stores the decompressed video recording in the service database 160. The security company calls a governmental agency, such as the police via 911, to send help to the user's location.

Figure 4:
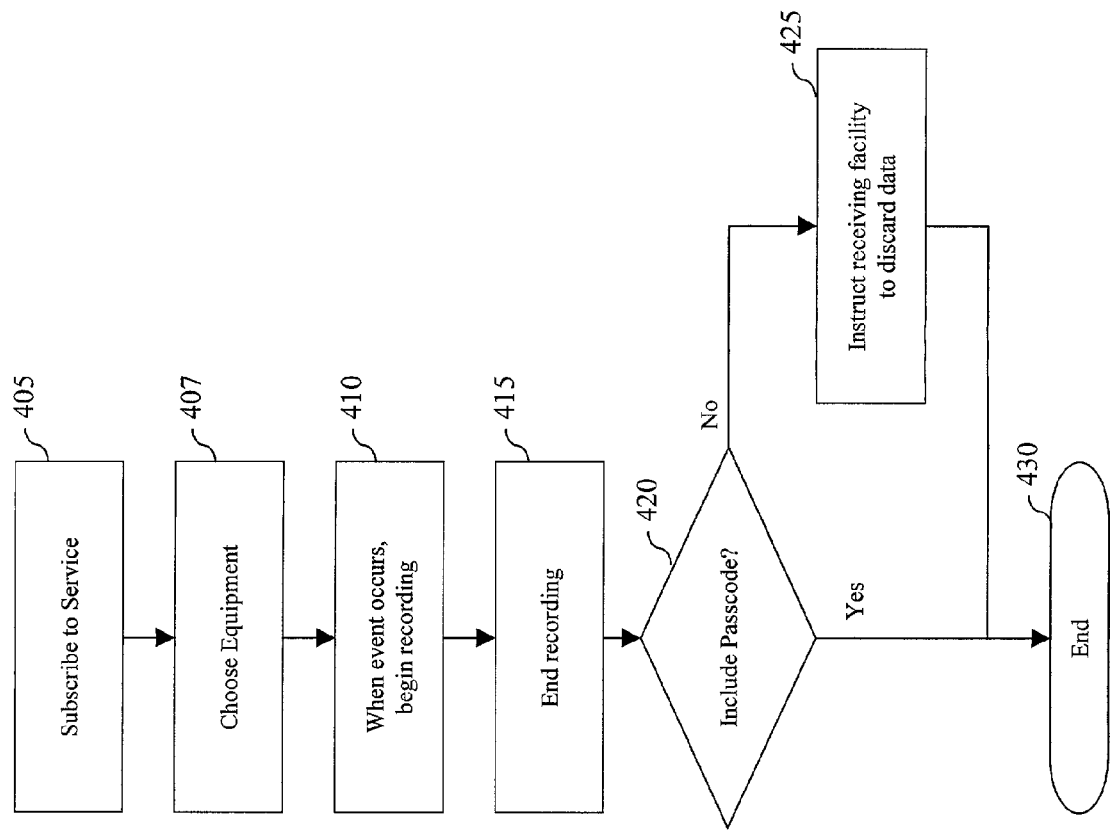
FIG. 4 is a flowchart illustrating an exemplary method for using an embodiment of the present invention.

FIG. 4 illustrates a process a user of an embodiment of the present invention utilizes to record video. In order to utilize a service provided by the embodiment of the present invention, a user must subscribe to the service 405. When the user subscribes to the service, the user chooses equipment to record video and transmit the images to the receiving facility 417.

For example, the user may currently have a cellphone 110 and may purchase a camera 125 to attach to the cellphone 110. The user may instead purchase a PDA with an integrated camera 115.

After the user has subscribed to the service and chosen equipment, the user is ready to make use of the service. When an event occurs that the user wishes to record, the user begins recording the event 410. The user may continue recording until the event ends or for as long as the user desires.

Subsequently, the user ends the recording 415. In an embodiment of the present invention, the receiving facility 140 may retain or discard the recording based on the user's direction. For example, in the process shown in FIG. 4, upon ending the recording, the user may include a passcode 410. The passcode comprises a deletion indicator, instructing the receiving facility 140 that the user does not wish to retain the recording. The user may also decide to retain the recording and therefore, does not include the passcode when ending the recording.

If the receiving facility 140 does not receive the passcode when the user ends the recording, the receiving facility 140 retains the recording. Subsequently, the user informs the receiving company of the status of the user and/or the recording 425. In response, the receiving facility 140 retains or discards the recording. Once the user either includes the passcode or instructs the receiving facility verbally or by other means to discard the data, the process shown in FIG. 4 ends 430.

An embodiment of the present invention as a Video Witness provides an illustration of the process shown in FIG. 4. Once Video Witness is activated, it continues to record until the person deactivates it with the correct passcode or until the end of recording time is reached. If the recording is deactivated with the correct passcode, then the security company is be notified and the video recording is deleted from storage. However, if the recording is stopped without the entry of the correct passcode or if the end of the recording time is reached, the security company is alerted and the video recording is retained.

When the user stops recording without providing the correct passcode, the security company retains the video recording and may alert a governmental authority. To prevent a false alarm, when Video Witness has been stopped without the correct passcode, the user may call the security company or contact the security company via another secure method and provide the correct passcode within a user-designated time period. The security company waits to inform authorities until either it is sure the user is encountering a dangerous situation or until the user-designated time period has expired.

The following example illustrates an embodiment of the present invention as a "Video Witness." While driving home late one evening, a woman, who subscribes to the service, notices blue lights in her rear view mirror. She pulls off to the side of the road and stops her car. She is unsure as to whether the person in the vehicle with the blue lights is really a police officer.

She quickly pulls out her PDA and activates the Video Witness. Once it is activated, her user profile and location are sent to the security company to alert a monitoring agent and to provide her identity to the security company. Meanwhile, her PDA continuously transmits the compressed video. She places her PDA on the driver side dashboard while waiting for the person to walk up to her car. The person is, in fact, a police officer. He informs her that she has been speeding and that she will receive a warning ticket.

After giving her the warning ticket, the officer drives off. She retrieves her PDA from the dashboard and enters her passcode to deactivate the Video Witness. Since she has indicated that she is no longer in danger, the transmitted recording is deleted from storage at the security company, and her security company discontinues monitoring of situation.

In an alternative scenario, the "police officer" is an impersonator. Fortunately, the woman anticipates this possibility as the impersonator is approaching her car. She quickly pulls out her PDA and activates the Video Witness. Before the impersonator approaches her window, she videotapes her surroundings and the vehicle the impersonator is driving. Her security company uses this information to identify her location and to identify the potential assailant. She holds her PDA in her hand to prepare for video recording while waiting for the impersonator. When she is asked to step out of her car instead of handing over her driver's license, she turns off her PDA.

Since Video Witness was stopped without entering the correct passcode, the security company who has been monitoring the situation is immediately alerted and her transmitted recording is automatically saved for permanent storage. A security agent quickly contacts 911 to send help to her location. The police are able to intervene in a potentially dangerous situation.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A method for recording a digital video image comprising:
   capturing a video image on a video-capture device;
   compressing the digital video image to create a compressed image file;
   transmitting the compressed image file over a wireless transmission channel using a real-time control protocol;
   retransmitting the compressed image file over a packet network to a security office, wherein the security office uses the digital video image to determine if assistance should be sent to a location of the capturing of the video image; and
   transmitting a deactivation code and a passcode with the compressed image file, wherein the deactivation code comprises an instruction to the security office receiving the digital video image to end a current recording of the digital video image, wherein, in response to receiving the deactivation code, the passcode instructs the security office to delete the recorded digital video image if the passcode is determined to be valid, and wherein if the passcode is determined to be invalid, the digital video image is retained by the security office.

2. The method of claim 1, wherein the video-capture device comprises a cellphone.

3. The method of claim 1, wherein the video-capture device comprises a personal digital assistant.

4. The method of claim 1, wherein the video-capture device comprises:
   a video camera; and
   a wireless modem.

5. The method of claim 1, wherein the transmission channel comprises a long-range transmission channel.

6. The method of claim 1, further comprising:
   determining an origin of the digital video image; and
   transmitting the origin with the compressed image file.

7. The method of claim 6, wherein the determining comprises determining the origin using a GPS receiver.

8. The method of claim 6, wherein the determining comprises determining the origin using a cell identifier in a cellular network.

9. The method of claim 6, wherein the determining comprises determining the origin using an E-911 service.

10. The method of claim 1, further comprising receiving the compressed image file in a secure remote location.

11. A method for recording a digital video image comprising:
    capturing a video image on a video-capture device;
    integrating the captured video with audio and data;
    compressing the integrated video image using a Moving Picture Experts Group (MPEG)-4 compression format to create a compressed image file;
    transmitting the compressed image file over a wireless transmission channel;
    retransmitting the compressed image file over a packet network to a security office, wherein the compressed image file is received in the security office, wherein the security office uses the digital video image to determine if assistance should be sent to a location of the capturing of the video image; and
    transmitting a deactivation code and a passcode with the compressed image file, wherein the deactivation code comprises an instruction to the security office receiving the digital video image to end a current recording of the digital video image, wherein, in response to receiving the deactivation code, the passcode instructs the security office to delete the recorded digital video image if the passcode is determined to be valid, and wherein if the passcode is determined to be invalid the digital video image is retained by the security office.

12. The method of claim 11, further comprising viewing the compressed image file.

13. The method of claim 11, further comprising storing the compressed image file.

14. The method of claim 11, further forwarding the compressed image file.

15. The method of claim 11, further comprising notifying a governmental agency.

16. A method for recording a digital video image comprising:
    capturing a video image on a video-capture device;
    integrating the captured video with audio and data;
    compressing the integrated video image using a Moving Picture Experts Group (MPEG)-4 compression format to create a compressed image file;
    transmitting the compressed image file over a wireless transmission channel using a real-time control protocol;
    retransmitting the compressed image file over a packet network to a security office, wherein the security office uses the digital video image to determine if assistance should be sent to a location of the capturing of the video image by determining an identity of a user associated with the digital video image;
    transmitting the identity with the compressed image file; and
    transmitting a deactivation code and a passcode with the compressed image file, wherein the deactivation code comprises an instruction to the security office receiving the digital video image to end a current recording of the digital video image, wherein, in response to receiving the deactivation code, the passcode instructs the security office to delete the recorded digital video image if the passcode is determined to be valid, and wherein if the passcode is determined to be invalid, the digital video image is retained by the security office.

17. The method of claim 16 wherein the determining comprises receiving a user identification number.

18. The method of claim 16, wherein the determining comprises using authentication.

19. The method of claim 16, wherein the associating comprises searching a user-profile database.

20. The method of claim 19, wherein the user-profile database comprises a telephone service provider's subscriber database.

21. The method of claim 1, further comprising billing for provision of the service.

22. The method of claim 11 further comprising decompressing the compressed image using an MPEG-4 coder/decoder (CODEC).

* * * * *